(12) United States Patent
Hoyt

(10) Patent No.: US 6,749,238 B2
(45) Date of Patent: Jun. 15, 2004

(54) VACUUM NOZZLE

(75) Inventor: Jamie A. Hoyt, Binghamton, NY (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/132,193

(22) Filed: Apr. 26, 2002

(65) Prior Publication Data

US 2003/0201652 A1 Oct. 30, 2003

(51) Int. Cl.[7] .................................................. B26J 15/06
(52) U.S. Cl. ..................................................... 294/64.1
(58) Field of Search ............................. 294/64.1, 64.2, 294/64.3; 414/627, 737, 752.1; 901/40; 29/743

(56) References Cited

U.S. PATENT DOCUMENTS

| | | | | |
|---|---|---|---|---|
| 4,078,671 A | * | 3/1978 | Lundstrom | 414/627 |
| 4,763,941 A | * | 8/1988 | Sniderman | 294/64.1 |
| 4,770,454 A | * | 9/1988 | Muscher et al. | 294/64.1 |
| 4,960,298 A | * | 10/1990 | Moroi | 294/64.1 |
| 5,572,785 A | * | 11/1996 | Tveit | 29/468 |
| 5,688,008 A | * | 11/1997 | Hansch | 294/64.1 |
| 6,394,520 B1 | * | 5/2002 | Quick et al. | 294/64.1 |

* cited by examiner

Primary Examiner—Dean J. Kramer
(74) Attorney, Agent, or Firm—Burns, Doane, Swecker & Mathis, L.L.P.

(57) ABSTRACT

A vacuum nozzle includes a nozzle body and a nozzle tip joined to allow relative motion therebetween. A proximal portion of the nozzle tip is adapted to slidably engage in the axial direction a surface of the nozzle body. The proximal portion has at least one flexible arm and an interfacing element disposed thereon that can cooperatively engage with a receiving element associated with the nozzle body. By forming the vacuum nozzle in at least the two parts, the unsprung mass of the vacuum nozzle is reduced with an attendant reduction in force transferred to a component when contacted by the nozzle tip. A compliant element is positioned between the nozzle body and the nozzle tip and also contributes to reduce impact forces. A method of using a vacuum nozzle with a vacuum transfer system are also provided.

7 Claims, 2 Drawing Sheets

VACUUM NOZZLE

BACKGROUND OF THE INVENTION

1. Field of the Invention

The present invention relates generally to a nozzle. More particularly, the present invention relates to a vacuum nozzle for a pick and place machine.

2. Discussion of Related Arts

In the discussion of the related art that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention, if appropriate.

Vacuum transfer systems, so-called "pick and place" systems, have various uses. For example, a vacuum transfer system can be utilized to transfer components from a first station to a second station, such as in an assembly line or packaging process, or to manipulate components in a manufacturing environment, such as in the microelectronics industry.

In a vacuum transfer system, the nozzle piece physically touches the objects that are manipulated, e.g., the nozzle is manipulated to contact an object, forms a vacuum seal with the object, and then is manipulated to transfer the object to a second location. Both vacuum transfer system efficiency and component throughput can be improved by increasing the rate of transfer of the objects. However, an increase in the transfer rate is accompanied by an increase in the operating speed of the vacuum transfer system. Accordingly, an increase in the speed increases the contact velocity of the nozzle to the object. In one application, the object to be transferred is an integrated circuit, known in the industry as a die or a die chip.

Nozzles for vacuum transfer systems have previously been one continuous piece from the connection point with the vacuum transfer system to the tip, i.e., of unitary design. Such nozzles create impact forces arising from kinetic energy, with the impact forces varying proportionably to the mass and velocity following the kinetic energy formula, $KE=\frac{1}{2}mv^2$. Higher velocities can produce a higher impact force on the object with attendant failure rates and/or breakage of the object. Also, the pick efficiency, i.e., the success rate of the vacuum transfer system at picking up a component part.

Thus, in the above described vacuum transfer process and in similar processes, it is desirable to increase the vacuum transfer rate and object throughput while also minimizing the forces applied to the object and thereby minimize the undesirable effects of an increase speed, e.g., decrease the failure rate and incidence of breakage.

SUMMARY

The present invention provides a vacuum nozzle for a vacuum transfer system. In an exemplary embodiment, the nozzle comprises a nozzle body and a nozzle tip that are joined to allow relative movement therebetween. The nozzle body has a body passage extending axially therethrough from a first end to a second end. The nozzle tip includes a tip passage extending axially therethrough and is in operative communication with the body passage to port a vacuum to a distal portion of the nozzle tip. The nozzle tip includes a proximal portion and a distal portion, and is adapted at a distal end to contact a component to be manipulated. The proximal portion of the nozzle tip is adapted to slidably engage in the axial direction within the body passage of the nozzle body. The relative movement of the nozzle tip isolates the momentum contribution from the nozzle body as far as contributing to the force of impact of the vacuum nozzle with the component to be manipulated.

In a further exemplary embodiment, the nozzle comprises a nozzle body, a nozzle tip joined to the nozzle body to allow relative movement therebetween, and a compliant element. The compliant element is disposed between a seating surface of the nozzle tip and the second end of the nozzle body. The compliant element absorbs a portion of the impact forces associated with the momentum of the vacuum nozzle as the nozzle tip contacts a component to be manipulated. Further, the compliant element forms a vacuum seal between the nozzle body and the nozzle tip.

In an exemplary embodiment, the proximal portion of the nozzle tip slides telescopically within the body passage of the nozzle body. In an additional exemplary embodiment, the nozzle body includes a portion that slides telescopically within an interior portion of the nozzle tip.

In further exemplary embodiments, the body passage has a first radial dimension at a first portion and a second radial dimension at a second portion, the first radial dimension is greater than the second radial dimension. A shoulder is formed at the intersection of the first radial dimension and the second radial dimension. The proximal portion of the nozzle tip includes at least one flexible arm and an interfacing element disposed thereon, which protrudes radially outward to a radial dimension greater than the second radial dimension. The flexible arm elastically bends to allow the protruding interfacing element to slidably pass through the second portion. The interfacing element cooperatively engages with the shoulder in the nozzle body to provide a mounting feature.

Impact forces in a vacuum transfer system having a nozzle can be reduced by forming the nozzle in at least two parts. In an exemplary method of using a vacuum nozzle with a vacuum transfer system to manipulate components and to reduce impact forces, a vacuum nozzle is placed in fluid communication with a supply line in a vacuum transfer system. The vacuum transfer system is maneuvered to engage the vacuum nozzle with a component, which is then manipulated. The first part of the nozzle comprises a nozzle body adapted to attach to a supply line of the vacuum transfer system and the second part comprises a nozzle tip adapted to contact a component to be manipulated. A proximal portion of the nozzle tip is slidably engaged with the body passage of the nozzle body. Further, the proximal portion comprises at least one flexible arm and an interfacing element disposed thereon and the interfacing element cooperatively engages with a receiving element associated with the nozzle body to provide a mounting feature. By forming the nozzle in at least the two parts, the unsprung mass of the nozzle is reduced with attendant reduction in force transferred to a component when the nozzle contacts the component. Further, the vacuum nozzle can be assembled with the first part joined to the second part with a compliant element disposed therebetween.

In a further exemplary embodiment, a vacuum nozzle for a vacuum transfer system is used to manipulate components and to reduce impact forces thereon. A vacuum nozzle is positioned with respect to the object and the nozzle tip contacts the object which is then manipulated. The vacuum nozzle comprises a nozzle body and a nozzle tip joined to the nozzle body to allow relative movement therebetween. Therefore, the force of impact between the nozzle tip and the object is substantially based only on the momentum arising from the mass of the nozzle tip.

BRIEF DESCRIPTION OF THE DRAWING FIGURES

Aspects and advantages of the invention will become apparent from the following detailed description of preferred embodiments thereof in connection with the accompanying drawings in which like numerals designate like elements and in which.

DETAILED DESCRIPTION OF THE PREFERRED EMBODIMENTS

A vacuum nozzle for a vacuum transferring system minimizes the unsprung mass by separating the vacuum nozzle into at least two components. In one preferred embodiment, a compliant element, e.g., O-ring, spring, or other compliant element, is placed close to the tip of the nozzle that interacts with a component or die to be transferred. Such a multi-element nozzle reduces the unsprung mass from 30 to 40 grams, as in a typical unitary nozzle design, to less than 5 to 10 grams. Accordingly and by the application of the kinetic energy formula, as the mass decreases the kinetic energy can be reduced for a given velocity. A reduction in the kinetic energy correlates to a reduction in the force of impact. Alternatively, as the unsprung mass decreases the velocity or operating speed of the vacuum transfer system can increase proportionally, i.e., increases by the square root of the reduction in mass, while maintaining the same kinetic energy and thus the same force of impact.

Figure 1:
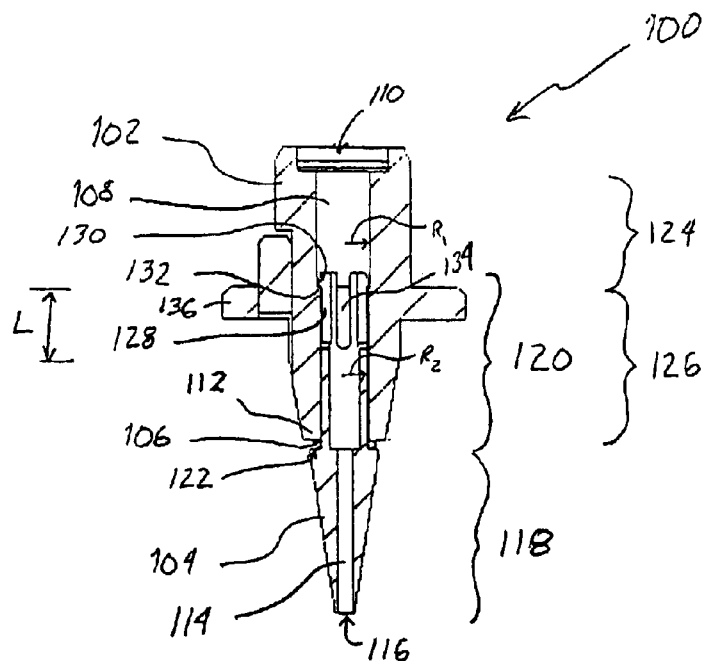
FIG. 1 is a cross-sectional view of an exemplary embodiment of a vacuum nozzle.

FIG. 1 is a cross sectional view of an exemplary embodiment of a vacuum nozzle on a vacuum transferring system. The vacuum nozzle 100 has a nozzle body 102, a nozzle tip 104, and a compliant element 106. The nozzle body 102 has a body passage 108 extending axially therethrough from a first end 110 to a second end 112. The nozzle tip 104 has a tip passage 114 extending axially therethrough. The tip passage 114 is in operative communication with a body passage 108 to port a vacuum to a distal end 116 of the nozzle tip 104. In an exemplary embodiment of a vacuum transfer system, the distal portion 118 of the nozzle tip 104 is adapted at its distal end 116 to contact a component to be manipulated, e.g., transferred, lifted, rotated, moved, held stationary, and so forth.

In one aspect, a portion of the nozzle tip 104, e.g., the proximal portion 120, freely moves within the body passage 108 of the nozzle body 102. For example, the nozzle tip 104 can telescopically slide within the body passage 108 independently from movement of the nozzle body 102. Thus, the mass of the nozzle body does not contribute to the momentum of the mass of the nozzle tip because of the free motion of the nozzle tip 104 relative to the nozzle body 102.

In another aspect, the distal portion 118 of the nozzle tip 104 is separated from the nozzle body 102 by the compliant element 106. The compliant element 106 is disposed between the nozzle tip 104 and the second end 112 of the nozzle body 102. The compliant element 106 absorbs at least a portion of the impact forces associated with the momentum of the vacuum nozzle 100 as the nozzle tip 104 contacts an object to be manipulated, e.g., die piece, packaging element, microelectronic component, and so forth. Further, the compliant element 106 forms a vacuum seal between the nozzle body 102 and the nozzle tip 104.

In the embodiments of the vacuum nozzle described above, the free movement of the nozzle tip 104 with respect to the nozzle body 102 separates the mass of the nozzle body from the mass of the nozzle tip, i.e., the unsprung mass, and results in reduced impact forces during operation of the vacuum nozzle 100. The placement of the compliant element 106 increases absorption of the impact forces during operation, e.g., the compliant element 106 cushions the impact of the nozzle tip 104 on the component to be transferred. Further, these aspects of the vacuum nozzle 100 can be incorporated either independently or jointly into the vacuum nozzle design and operation.

In an exemplary embodiment, the nozzle tip 104 has a seating surface 122 that contacts the nozzle body 102 and limits the axial motion thereof. Additionally where a compliant element 106 is present, the seating surface 122 contacts the compliant element 106, and limits the axial motion by the contact of the compliant element 106 with the nozzle body 102. In these exemplary embodiments, the proximal portion 120 of the nozzle tip 104 slides telescopically within the body passage 108 of the nozzle body 102 and the seating surface 122 extends from an exterior surface of the nozzle tip 104. Alternatively, the nozzle body 102 includes a portion that slides telescopically within an interior portion of the nozzle tip 104. In alternative embodiments, the seating surface 122 can extend from an interior surface of the nozzle tip 104.

The proximal portion 120 of the nozzle tip 104 is adapted to slidably engage in the axial direction a surface of the nozzle body 102. In an exemplary embodiment, the proximal portion 120 of the nozzle tip 104 is adapted to be inserted into the body passage 108. Here, the surface of the nozzle body 102 that is slidably engaged with the proximal portion 120 of the nozzle tip 104 is the interior surface of the nozzle body 102 or a portion thereof. In an alternative exemplary embodiment, the proximal portion 120 of the nozzle tip 104 is adapted to be inserted over the exterior surface of the nozzle body or a portion thereof. In that case, the surface of the nozzle body 102 that is slidably engaged with the proximal portion 120 of the nozzle tip 104 is the exterior surface of the nozzle body 102, or a portion thereof.

In an exemplary embodiment in which the proximal portion 120 of the nozzle tip 104 is adapted to be inserted into the body passage 108, the body passage 108 has a first radial dimension $R_1$ at a first portion 124 and a second radial dimension $R_2$ at a second portion 126. The first radial dimension $R_1$ is greater than the second radial dimension $R_2$. The first portion 124 defines an upper cavity in which at least the proximal end of the proximal portion 120 of the nozzle tip 104 moves. Further, the second portion 126 defines a passage in which at least a distal end of the proximal portion 120 of the nozzle tip 104 slides.

The difference in the radial dimensions of the first and second portions provides a mounting feature by which the nozzle tip 104 engages the nozzle body 102. The mounting feature retains the nozzle tip 104 in slidable engagement with the nozzle body 102. The mounting feature can, for example, be a friction fit or a pressure fit between cooperating elements on the nozzle tip 104 and the nozzle body 102. Additionally, the mounting feature allows an operator to exchange nozzle tips 104 by the removal of a first nozzle tip from the nozzle body 102 and the subsequent insertion of a second nozzle tip through the second portion 126 of the nozzle body 102. Thus, the nozzle tip 104 can be removed and/or replaced without disassembling the complete vacuum nozzle 100 from the vacuum transfer system. Accordingly, the selection and use of a particular nozzle tip for a specialized application, the replacement of a broken or malfunctioning nozzle tip, or the repair of a nozzle tip is facilitated.

In one embodiment of a mounting feature, the proximal portion 120 of the nozzle tip 104 is adapted in a suitable manner to be inserted into the nozzle body 102. For example, the proximal portion 120 of the nozzle tip 104 comprises at least one flexible arm 128 and an interfacing element 130 disposed thereon to provide the mounting feature. The interfacing element 130 protrudes radially outward from the surface of the proximal portion 120 at, for example, the proximal end thereof, to a radial dimension greater than the second radial dimension $R_2$ of the second portion 126 of the nozzle body 102. When inserted into the body passage 108, the flexible arm 128 can elastically bend to allow the protruding interfacing element 130 to slidably pass through the second portion 126 and, after entering the first portion 124, expand outward to cooperate with a receiving element 132 associated with the nozzle body. The receiving element 132 is, for example, on the surface of the body passage 108, such as a shoulder, a groove, a detent, and so forth, to provide the mounting feature. In the exemplary embodiment shown in FIG. 1, the receiving element 132 is a shoulder formed at the change in radial dimension between the first portion 124 and the second portion 126 of the body passage 108.

In alternative embodiments, the proximal portion of the nozzle tip is similarly adapted with a flexible arm and an interfacing element to be inserted over the nozzle body, which is further similarly adapted with a receiving element. Also, the arrangement and/or orientation of the interfacing element and the receiving element can be reversed on the respective nozzle body and nozzle tip, while still cooperating with each other to provide a locking and/or interfacing feature. For example, the interfacing element can protrude radially inward from the interior surface of the body passage and the receiving element can be cooperatively positioned on the proximal portion of the nozzle tip.

The adaptation of the proximal portion 120 of the nozzle tip 104 to slidably pass through the body passage 108 contributes to reducing the effective mass of the nozzle tip 104, and thus reduces the corresponding force of impact of the vacuum nozzle 100 when in operation in a vacuum transfer system. In one example, the proximal portion 120 of the nozzle tip 104 incorporates a flexible arm design. This flexible arm has a length L. An exemplary arm length is shown in FIG. 1, in which the flexible arms 128 are separated by a cutout 134 that extends over a minor portion of the proximal portion 120 of the nozzle tip 104, i.e., less than half the total length from the distal end of the proximal portion 120 to the seating surface 122.

Figure 2:
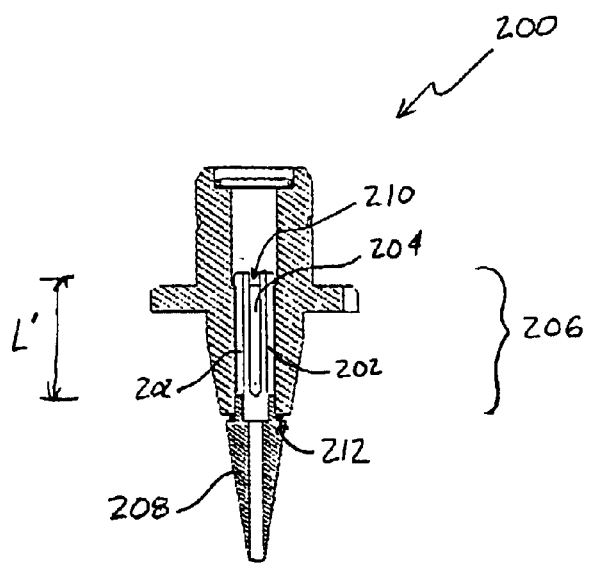
FIG. 2 is a cross-sectional view of an additional exemplary embodiment of a vacuum nozzle.

FIG. 2 is a cross sectional view of an additional exemplary embodiment of a vacuum nozzle 200. In FIG. 2, an exemplary arm length L' is shown in which the flexible arms 202 are separated by a cutout 204 that extends over a major portion of the proximal portion 206 of the nozzle tip 208, i.e., more than half the total length from the distal end 210 of the proximal portion 206 to the seating surface 212.

In further examples, the flexible arms can vary in number and can be separated by a corresponding number of cutouts. Thus, as the number of cutouts increases, e.g., from two cutouts to three cutouts, four cutouts, or more, removal of material from the proximal portion of the nozzle tip reduces the total unsprung mass of the nozzle with a corresponding reduction in the force of impact of the nozzle when in operation in a vacuum transfer system.

The compliant element 106 serves several functions in the vacuum nozzle 100. For example, the compliant element 106 provides a vacuum seal between the nozzle body 102 and the nozzle tip 104. Further, the compliant element 106 absorbs some of the force of impact as the nozzle tip 104 impacts the component to be transferred. In such a case, the total unsprung mass of the vacuum nozzle 100 approximately correlates to the mass of the nozzle tip 104 and not to the mass of the entire vacuum nozzle 100. In other words, the compliant element 106 isolates contributions from the mass of the nozzle body to the force of impact and limits the force to the mass of the nozzle tip.

Further, the compliant element provides dampening of impact oscillations that arise during maneuvering of the vacuum nozzle into contact with a component. Impact oscillations continue for a period of time after the nozzle contacts the component system. The compliant element acts as a dampening device, absorbing some of the energy and reducing the magnitude of the oscillation as well as the number of oscillations and the duration of oscillations. For example, without a compliant element, the oscillations dissipate in an approximate linear fashion. With a compliant element, the oscillations dissipate approximately exponentially.

To position the compliant element 106, the compliant element 106 is placed over the proximal portion 120 of the nozzle tip 104. After passing the proximal portion 120 through the second portion 126, the compliant element 106 rests against the seating surface 122 of the nozzle tip 104 and the second end 112 of the nozzle body 102. In the embodiment shown, the flexible arms 128 of the nozzle tip 104 are manipulated through the compliant element 106 to slidably pass through the passage 108 of the nozzle body 102 and to lock and/or interface with the nozzle body 102 by a mounting feature 132.

Figure 3:
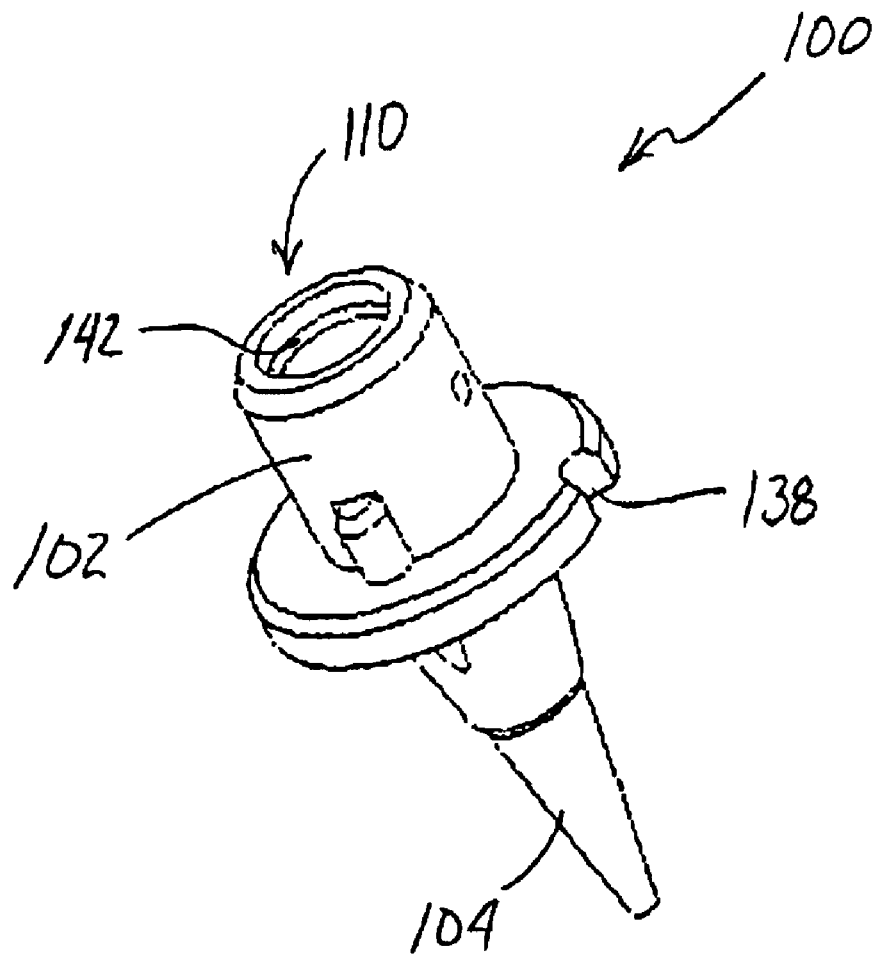
FIG. 3 is perspective view of an assembled vacuum nozzle of FIG. 1.

As seen in FIG. 3, the assembled vacuum nozzle 100 has a nozzle tip 104 and a nozzle body 102 with a first end 110 having a tubular shape. In addition, the first end 110 of the nozzle body 102 is adapted to interface and/or operatively communicate with the vacuum transfer system. For example, the first end 110 of the nozzle body 102 has a retaining element 142, e.g., a permanent or a releasable retaining clip, that allows for it to be positioned on the vacuum transfer system and to be removed, repaired, or exchanged with additional nozzles by the operator.

The nozzle tip can have any suitable shape. For example as represented in FIG. 3, the nozzle tip is conical. Conical tips can be used, for example, to pick up small passive type components, such as electronic chips, or leadless components. Other nozzle tip geometries include rectangles, ovals, irregular shapes conforming to component surfaces, multiple orifice shapes, and so forth. Generally, the nozzle tip shape and number of orifices are determined as function of the size, orientation and shape of the component to be picked up and the vacuum capability of the vacuum transfer system.

Additionally and referring to FIG. 1, the nozzle body 102 has a flange 136 about the outer surface that extends approximately perpendicular to the axial body passage 108. The flange 136 provides ease of manipulation, and/or orientation features. For example, the flange 136 has an interface notch 138 (visible in FIG. 3) at a position radially outward of the nozzle body 102 to thereby orient the nozzle 100 in the vacuum transfer system or to orient the nozzle body 102 with respect to a reference point, i.e., the interface notch positions the nozzle in a staging position, such as upright in a staging tray, for exchange onto and off of the vacuum transfer system, such as by automatic control of the vacuum transfer system.

In addition to limiting the unsprung mass of the nozzle, alternative and/or additional mass reduction techniques can be utilized. For example, in one embodiment, the nozzle body is made of plastic and the nozzle tip is made of a stainless steel. Alternatively, the nozzle tip is made of a plastic, a ceramic, or other suitable material. Further, in other embodiments, the nozzle tip incorporates mass reduction by the use of honeycombed and/or other hollow or semi-hollow construction techniques.

Impact forces in a vacuum transfer system having a vacuum nozzle are reduced by forming the vacuum nozzle in at least two parts. In an exemplary method, the first part comprises a nozzle body adapted to attach to a supply line of the vacuum transfer system and the second part comprises a nozzle tip adapted to contact a component to be manipulated. The first part is joined to the second part with a compliant element disposed therebetween. A proximal portion of the nozzle tip is slidably engaged with the body passage of the nozzle body. Further, the proximal portion comprises at least one flexible arm and an interfacing element disposed thereon. The interfacing element cooperatively engages with a receiving element associated with the nozzle body. By forming the nozzle in at least the two parts, the unsprung mass of the nozzle is reduced with attendant reduction in force transferred to a component when the nozzle contacts the component.

In a further exemplary embodiment, a method of using a vacuum nozzle with a vacuum transfer system to manipulate components and to reduce impact forces thereon is provided. The method places a vacuum nozzle in fluid communication with a supply line in a vacuum transfer system and maneuvers the vacuum transfer system to engage the vacuum nozzle with a component that is then manipulated. The vacuum nozzle comprises at least two parts, a first part comprising a nozzle body adapted to attach to the supply line of the vacuum transfer system and a second part comprising a nozzle tip adapted to contact the component to be manipulated. The second part slidably engages the first part with a compliant element disposed therebetween. Further, the proximal portion of the nozzle tip slidably engages with the body passage of the nozzle body. Additionally, the proximal portion comprises at least one flexible arm and an interfacing element disposed thereon. In the method, the interfacing element cooperatively engages the interfacing element with a receiving element associated with the nozzle body. In the exemplary method, engaging the multi-element nozzle with the component to be manipulated includes contacting the nozzle tip with the component such that at least a portion of the force due to the contacting is absorbed by the compliant element.

A vacuum nozzle in keeping with the embodiments described herein, was operated in a vacuum transfer system to manipulate electronic components, i.e, a die. An exemplary embodiment of a vacuum nozzle comprised a nozzle body, a nozzle tip, and a compliant element disposed therebetween at a seating surface. When operated to contact and manipulate a component, the impact forces produced were less then 4 lbf. For example, when the compliant element was a 0.02 inch circumferential diameter O-ring, the impact forces were 3.51 lbf; when the compliant element was a 0.035 inch circumferential diameter O-ring, the impact forces were further reduced to 2.21 lbf. In contrast, a vacuum nozzle of unitary design produced an impact force of 7.67 lbf. Thus, the impact force of the exemplary vacuum nozzle on the component was approximately 25% to 50% of the previous force associated with the use of a vacuum nozzle of a unitary design.

The results further indicate that the total impact force varies according to the kinetic energy formula. Thus, as the mass was reduced, the impact force was reduced in proportion (neglecting the effects of the compliant element). Accordingly and for example, a 25% to 50% reduction in the mass translates to an approximately 25 to 50% reduction in the force. Similar reductions in the impact force can be realized by appropriate reductions in the unsprung mass of the nozzle.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A vacuum nozzle, comprising:
   a nozzle body with a body passage extending axially therethrough from a first end to a second end; and
   a nozzle tip with a tip passage extending axially therethrough, the tip passage in operative communication with the body passage to port a vacuum to a distal end of the nozzle tip;
   wherein a proximal portion of the nozzle tip is adapted to slidably engage in the axial direction a surface of the nozzle body and the nozzle tip and the nozzle body are joined to allow relative movement therebetween;
   wherein the body passage has a first radial dimension at a first portion and a second radial dimension at a second portion, the first radial dimension greater than the second radial dimension, and
   wherein the proximal portion of the nozzle tip comprises at least one flexible arm and an interfacing element disposed thereon, wherein the interfacing element protrudes radially outward to a radial dimension greater than the second radial dimension and the flexible arm elastically bends to allow the protruding interfacing element to slidably pass through the second portion.

2. The nozzle of claim 1, wherein the interfacing element is cooperatively engaged to a receiving element associated with the nozzle body.

3. The nozzle of claim 1, further comprising a compliant element disposed between the nozzle body and the nozzle tip.

4. The nozzle of claim 3, wherein the compliant element provides a vacuum seal between the nozzle body and the nozzle tip.

5. A vacuum nozzle for a vacuum transferring system, the nozzle comprising:
   a nozzle body with a body passage extending axially therethrough from a proximal end to a distal end;
   a nozzle tip with a tip passage extending axially therethrough, the tip passage in operative communication with the body passage to port a vacuum to a distal portion of the nozzle tip, and a proximal portion of the nozzle tip adapted to slidably engage in the axial direction a surface of the nozzle body, the distal portion separated from the proximal portion by a seating surface;

a compliant element disposed between the seating surface of the nozzle tip and the distal end of the nozzle body;

wherein the body passage has a first radial dimension at a first portion and a second radial dimension at a second portion, the first radial dimension greater than the second radial dimension, and wherein the proximal portion of the nozzle tip comprises at least one flexible arm and an interfacing element disposed thereon, wherein the interfacing element protrudes radially outward to a radial dimension greater than the second radial dimension and the flexible arm elastically bends to allow the protruding interfacing element to slidably pass through the second portion.

6. The nozzle of claim 5, wherein the interfacing element cooperatively engages a receiving element associated with the nozzle body.

7. The nozzle of claim 5, wherein a compliant element provides a vacuum seal between the nozzle body and the nozzle tip.

* * * * *